C. S. ALFORD AND O. LOMBARD.
DUST REMOVING DEVICE FOR GRANITE SURFACING MACHINES.
APPLICATION FILED NOV. 22, 1919.
1,333,597.
Patented Mar. 16, 1920.
2 SHEETS—SHEET 1.
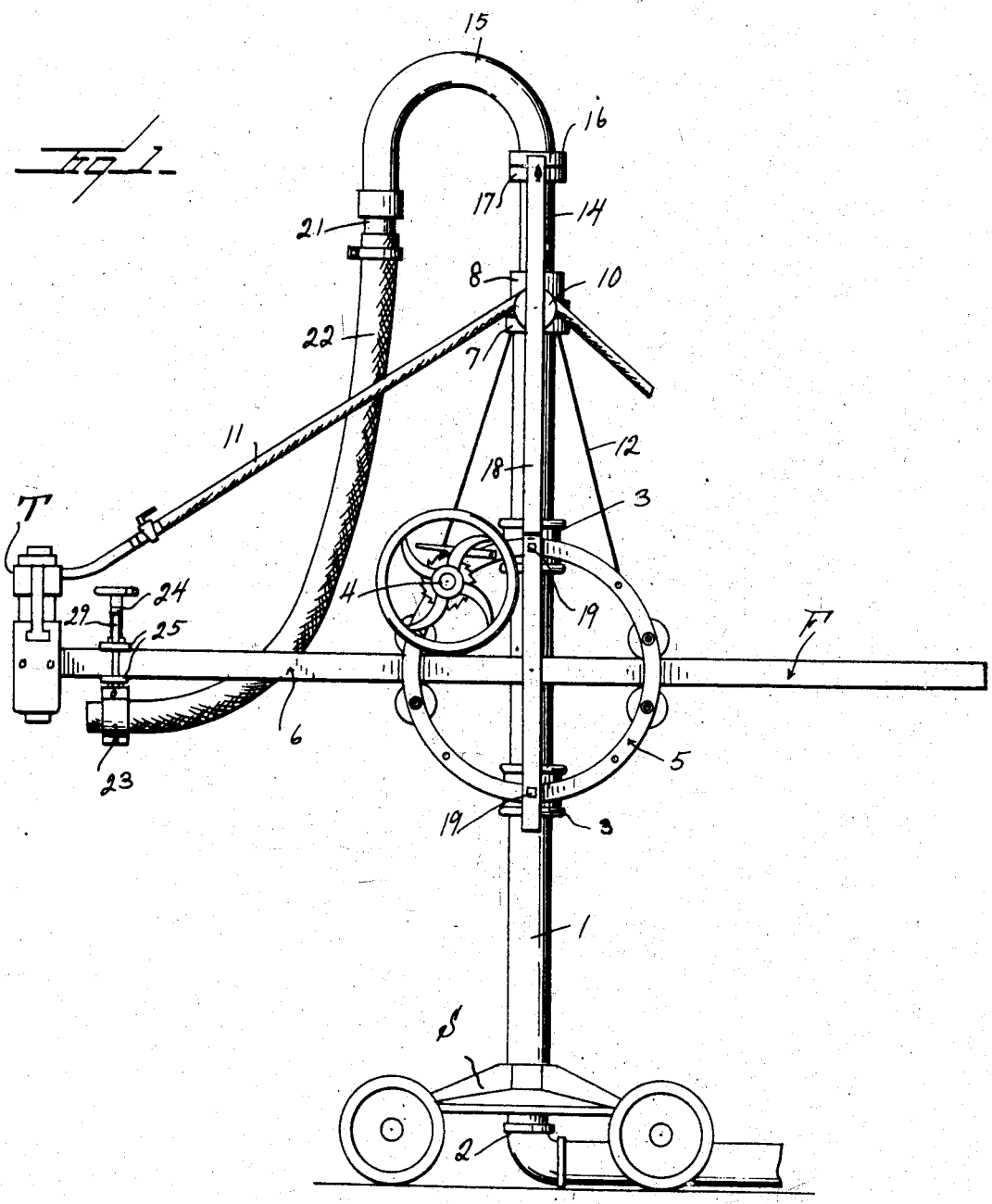

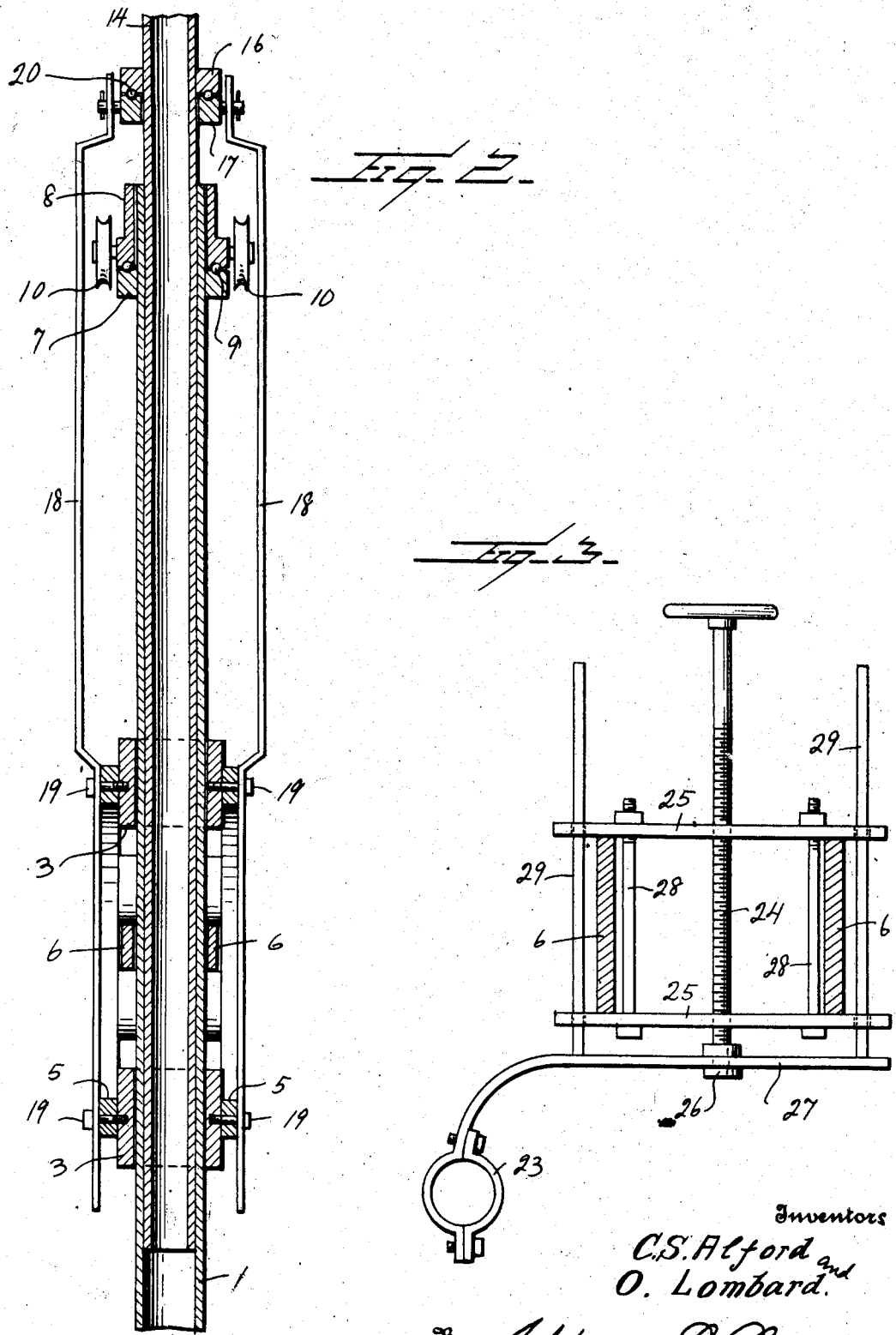

UNITED STATES PATENT OFFICE.

CHARLES S. ALFORD AND ORLANDO LOMBARD, OF WAUSAU, WISCONSIN.

DUST-REMOVING DEVICE FOR GRANITE-SURFACING MACHINES.

1,333,597.        Specification of Letters Patent.     Patented Mar. 16, 1920.

Application filed November 22, 1919. Serial No. 340,049.

*To all whom it may concern:*

Be it known that we, CHARLES S. ALFORD and ORLANDO LOMBARD, citizens of the United States, residing at Wausau, in the county of Marathon and State of Wisconsin, have invented certain new and useful Improvements in Dust-Removing Devices for Granite-Surfacing Machines, of which the following is a specification, reference being had to the accompanying drawings.

This invention relates to certain improvements in dust removing devices for granite surfacing machines, and it is an object of the invention to provide a machine of this general character with novel and improved means whereby dust is effectively removed from the point where the dust originates.

It is also an object of the invention to provide a machine of this general character with novel and improved means for removing the dust, and which means are so constructed and arranged to offer no obstruction or hindrance to the operation of the machine proper.

A still further object of the invention is to provide, in connection with a granite surfacing machine, movable around a vertical axis, a novel and improved dust removing mechanism which offers no interference with the desired movement of the working tool, and wherein twisting or kinking is prevented of the parts comprised in the dust removing means.

Furthermore it is an object of the invention to provide a novel and improved dust removing means embodying a conduit through which the dust is drawn together with means for supporting the receiving end of the conduit in a manner whereby the same may be properly positioned with respect to the cutting tool.

Another object of the invention is to provide a novel and improved dust removing device which can be used in connection with any granite surfacing machine embodying a hollow standard.

The invention consists in the details of construction and in the combination and arrangement of the several parts of my improved dust removing device for granite surfacing machines whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view in side elevation of a dust removing device for granite surfacing machines constructed in accordance with an embodiment of our invention;

Fig. 2 is an enlarged fragmentary view, partly in section and partly in elevation of the standard, as herein included, together with the parts concomitant thereto, and, Fig. 3 is an enlarged fragmentary view, partly in section and partly in elevation illustrating in detail the mechanism for adjustably supporting the suction or receiving end of the hose, as herein set forth.

As disclosed in the accompanying drawings, S denotes a supporting member, preferably a portable truck which is provided with an upstanding tubular standard 1. The lower end portion of the standard, as indicated at 2, is adapted for communication with a suction fan or the like.

Slidably mounted upon the standard 1, and spaced apart longitudinally thereof are the sleeves 3, having secured thereto at opposite sides of the standard the supporting structure 5 for the horizontally disposed carrying member 6. The structure 5 is of a type now in use, and which supports the frame 6 in a manner whereby the tool T carried by one end of the frame may be moved horizontally in a direction toward or from the standard 1. Fixed to and surrounding the upper end portion of the standard 1 is a collar 7, upon which rests a collar 8. Interposed between the collars 7 and 8 are the anti-friction members 9, preferably ball bearing. At substantially diametrically opposed points the collar 8 rotatably supports the pulleys 10. The tool T is preferably of a pneumatic type, and the hose 11 therefor, leading from the desired source of air under pressure, passes over and is supported by one of the pulleys 10.

Disposed over the second pulley 10 is a flexible member 12, having one end portion suitably secured to the structure 5, and having its opposite end portion engaged with the winding drum 4 supported by the structure 5. The drum 4 may be rotated in any desired manner, and operates to vertically move or adjust the frame 5, as the occasions of practice may necessitate.

Telescopically engaged within the standard 1 through the top thereof is an elongated tubular member 14 of desired length, and which fits snugly within the standard 1, and is capable of movement longitudinally of said standard 1. The upper end portion of the elongated tubular member 14 is formed into a goose neck 15, and secured to and extending around the member 14 adjacent the inner end portion of the goose neck 15 is a collar 16. The collar 16 coacts with a collar 17 surrounding the member 14, and secured to the upper end portions of the elongated members or strips 18, arranged at opposite sides of the standard 1 and secured, as at 19, to the sleeves 3, so that the member 14 will move in unison with and in the same general direction as the carrying member or frame 6 when the same is raised or lowered. Interposed between the collars 16 and 17 are the anti-friction members 20, preferably ball bearing, so that the member 14 may rotate with a minimum of frictional resistance when the member or frame 6 is swung around the standard 1, and which swinging movement is permitted by the sleeves 3.

21 denotes a nipple in swivel engagement with the outer end portion of the goose neck 15, and with which is engaged an end portion of a flexible hose 22. The hose 22 is of a length to extend to a point in close proximity to the working end of the tool T, so that the suction through the standard 1, the member 14 and the hose 22 will remove the dust at the point where said dust originates.

The receiving end of the hose 22 is engaged within a clamp 23, and which clamp is mounted for vertical adjustment or in a direction toward or from the work in accordance with the requirements of practice.

As herein disclosed the desired movement or adjustment of the clamp 23 is obtained through the medium of a shank 24, threaded through the plates 25, and having one end portion in swivel engagement, as at 26, with a portion 27 of a member of the clamp underlying said plates.

The member or frame F comprises two transversely spaced beams arranged in parallelism, and the plates 25 are clamped to the upper and lower edges of said beams through the medium of the holding bolts 28. The portion 27 of the clamp is provided with the upstanding elongated rods or pins 29 arranged at opposite sides of the shank 24, and which pins or rods 29 are slidably disposed through the plates 25. The pins or rods 29 coact with the plates 25, to hold the portion 27 of the clamp against rotary or swinging movement.

In practice it has been found of special advantage to have the collar 8 of a material length so that the movement of the member 14 therethrough will be materially facilitated.

From the foregoing description it is thought to be obvious that a dust removing device for granite surfacing machines constructed in accordance with our invention is particularly well adapted for use by reason of the convenience and facility with which it may be assembled and operated, and it will also be obvious that our invention is susceptible of some change and modification without departing from the principles and spirit thereof, and for this reason we do not wish to be understood as limiting ourselves to the precise arrangement and formation of the several parts herein shown in carrying out our invention in practice except as hereinafter claimed.

We claim:

1. A stone dressing machine comprising, in combination, a tubular standard adapted for connection with suction means, a supporting structure slidably mounted on the standard, an operating tool carried by the structure, a collar supported by the structure above the standard, a tubular member extending within the standard and having movement longitudinally thereof, a collar carried by said member and imposed upon the first-named collar, whereby said tubular member is supported for rotary movement, and a hose leading from said tubular member to a point in close proximity to the tool.

2. A stone dressing machine comprising, in combination, a supporting structure, an operating tool carried thereby, a flexible pipe adapted for connection with the suction means and leading to a point in close proximity to the tool, a holding member coacting with the receiving end of the pipe and an endwise movable member carried by the supporting structure and coacting with the clamp for adjusting the receiving end of the pipe toward or from the work.

3. A stone dressing machine comprising, in combination, a supporting structure, an operating tool carried thereby, a plate held to the supporting structure, a shank threaded through said plate, a clamp in swivel engagement with the shank, and a flexible pipe adapted for connection with suction means, the receiving end portion of the pipe being held by the clamp at a point in proximity to the tool.

4. A stone dressing machine comprising, in combination, a supporting structure, an operating tool carried thereby, a plate held to the supporting structure, a shank threaded through said plate, a clamp in swivel engagement with the shank, a flexible pipe adapted for connection with suction means, the receiving end portion of the pipe being held by the clamp at a point in proximity to the tool, and means carried by the clamp and coacting with the plate for holding the clamp against swinging movement with respect to the shank.

In testimony whereof we hereunto affix our signatures.

CHARLES S. ALFORD.
ORLANDO LOMBARD.